United States Patent
Müller et al.

[11] Patent Number: 5,490,383
[45] Date of Patent: Feb. 13, 1996

[54] METHOD OF PRESSURE CONTROLLING A HYDROSTATIC MACHINE HAVING AN ADJUSTABLE DELIVERY VOLUME

[75] Inventors: Karsten Müller, Lohr/Main; Jörn Glotzbach, Darmstadt, both of Germany

[73] Assignee: Mannesmann Rexroth GmbH, Germany

[21] Appl. No.: 289,768

[22] Filed: Aug. 12, 1994

[30] Foreign Application Priority Data

Aug. 13, 1993 [DE] Germany .................... 43 27 313.0

[51] Int. Cl.⁶ .................... F16D 31/00; F16D 31/02; F15B 13/16
[52] U.S. Cl. .................... 60/327; 60/452; 60/443; 91/361
[58] Field of Search .................... 60/445, 459, 443, 60/452, 368, 327; 91/459, 361

[56] References Cited

U.S. PATENT DOCUMENTS

| | | | |
|---|---|---|---|
| 4,375,747 | 3/1983 | Friedrich | 60/443 X |
| 4,537,364 | 8/1985 | Pollman et al. | 60/452 X |
| 4,689,956 | 9/1987 | Hein | 60/445 X |
| 4,741,159 | 5/1988 | Gunda et al. | 60/443 |
| 5,070,695 | 12/1991 | Metzner | 60/449 X |

FOREIGN PATENT DOCUMENTS

| | | |
|---|---|---|
| 345665 | 6/1989 | European Pat. Off. . |
| 41273 | 9/1989 | European Pat. Off. . |
| 3623066 | 1/1988 | Germany . |
| 3733396 | 4/1989 | Germany . |
| 287308 | 8/1989 | Germany . |
| 3923283 | 9/1992 | Germany . |
| 1670675 | 8/1991 | U.S.S.R. . |

OTHER PUBLICATIONS

Hummel, E.: u.a.: Digitale Hydraulische Sensortechnik am Beispiel einer Spritzgiebmaschine in: O+P Ölhydraulik und Pneumatic, 36, 1992, Nr. 11, S. 730–737.
Backg, W.: Neue Möglichkeiten der Verdrangerregelungen, Mar. 1988 S. 25–35.

*Primary Examiner*—Edward K. Look
*Assistant Examiner*—Hoang Nguyen
*Attorney, Agent, or Firm*—Emrich & Dithmar

[57] ABSTRACT

The present invention provides a method for pressure control of an adjustable pump for a hydraulic system including at least a load. Depending on the size of the system, i.e. the servo cylinder, hydrostatic machine and the line tubing, the fluid volume contained in the system between the adjustable pump and the low pressure side of the load is largely different. In controlling the load pressure in such a system, for example a press or a molding machine for plastic material, a pressure controller adaptively and automatically adjusts the damping factor of the controller and thus the controlling quality independent of the fluid volume of the system to a constant value. It is a benefit of the invention that all adjusting operations of the pressure controller are eliminated which have been necessary heretofore to obtain an appropriate control of the fluid system.

7 Claims, 2 Drawing Sheets

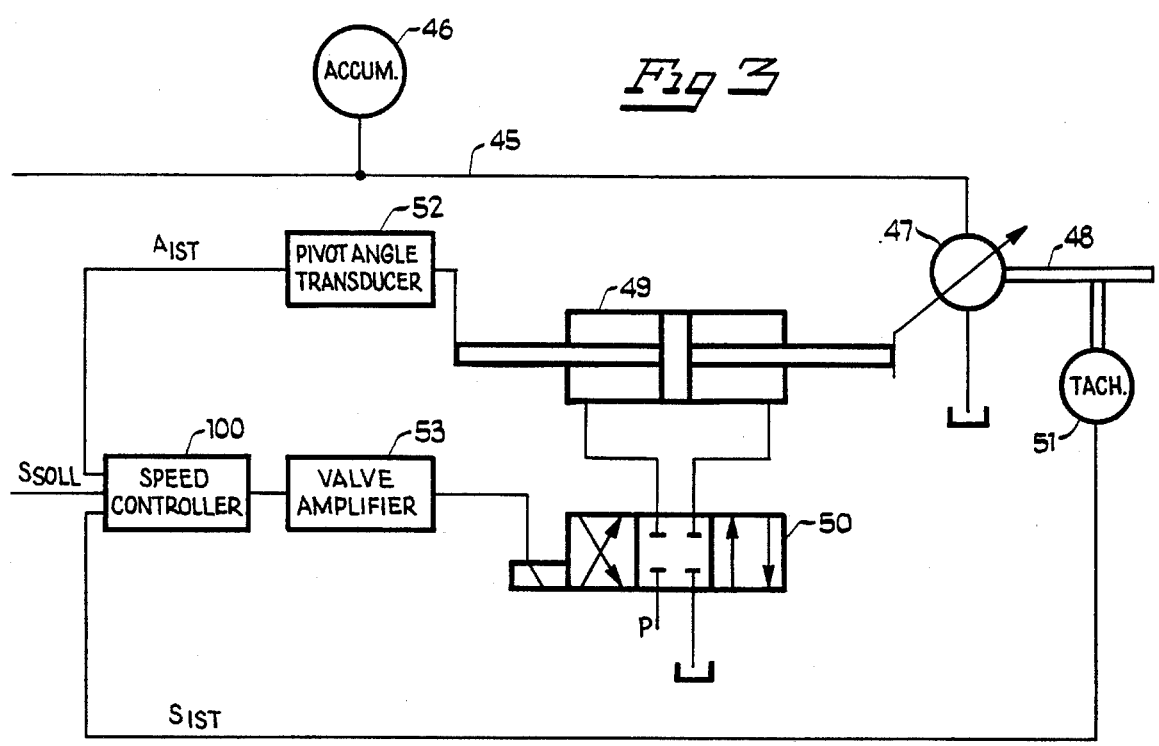

METHOD OF PRESSURE CONTROLLING A HYDROSTATIC MACHINE HAVING AN ADJUSTABLE DELIVERY VOLUME

DESCRIPTION

The present invention relates to a method for pressure controlling a hydrostatic machine having a variable delivery volume.

FIG. 1 of the drawings enclosed illustrates a well-known pressure and pivot angle control loop for a variable volume pump 1 (Mannesmann Rexroth Rd. 67016/06.93 Electrical Control System . . . ). The pump 1 of variable volume, in particular an axial piston type pump delivers fluid through a pump pressure line 2 to a plurality of loads 3. An electrically controlled proportional valve 4 (continuously operable valve) controls the position of the swash plate of the variable pump 1 via the adjusting piston of the adjusting means 6. The volume delivered through the pressure line 2 is proportional to the pivot angle of the swash plate. The adjusting piston 5 biased by a spring 7 is continuously supplied by pump pressure.

The control loop comprises a valve position controller 8, a pivot angle controller 9 and a pressure controller 10, respectively. The actual pressure value $P_{ist}$ is sensed by a pressure transducer 11 communicating with the pump line 2. The position of the swash plate, i.e. the pivot angle and thus the delivered volume is sensed by an inductive pivot angle transducer 12. Both actual values for pressure and pivot angle are compared with the desired values for pressure and pivot angle in the controllers 9 and 10. The output signals of the controllers are fed to a minimum signal transmitter 15 transmitting one of its input signals, which ever is the smaller signal, to the controller 8, thus making sure that the controller corresponding to the operating point of the control loop is activated.

For example, when actuating a cylinder in the system, to which pressurized fluid is to be supplied, a desired speed results when the desired value of the fluid volume equals the actual value of the fluid volume, whereas the fluid pressure, i.e. the pressure prevailing in the cylinder depends on the load, and results from the force to be applied, i.e. the desired pressure value is set to a higher value than the actual pressure value which occurs when the cylinder is actuated. In this condition of operating the cylinder, the difference (error) between the desired value and the actual value of the volume is smaller than the difference (error) between the desired value and the actual value of the pressure, and the minimum value transmitter 15 transmits the smaller signal to the valve controller 8, i.e. the signal from the volume controller 9 in the present case. In other words, the volume controller 9 is activated when actuating the servo cylinder.

However, when the servo cylinder thus actuated moves against a stop, for example in closing the mold halves of a molding machine for plastic material, or in actuating a press or under operating conditions calling for very low stroke increments of the cylinder, but requiring relatively high pressures, the minimum value transmitter is switched to activate the pressure control loop by the pressure controller 10, when the difference between the actual pressure value and the desired pressure value becomes zero, i.e. the pressure required is reached and the fluid volume delivered by the adjustable pump is substantially smaller than the desired volume value. At still-stand of the servo cylinder, the volume delivered just covers the leakage of the system.

The control system further includes a valve position controller 8 receiving the output signal of the minimum value transmitter 15, defining a desired position value and a signal ressembling the actual position of the valve spool in the proportional valve 4 which signal is sensed in a stroke transducer 16. The output signal of the valve controller 8 is fed via a valve driver stage 17 to the proportional valve 4. When the pressure controller 10 is activated, the transient oscillation of the control loop, i.e. the damping of the pressure controller when changing the desired pressure value is largely responsive to the volume of the fluid contained in the hydraulic system 2,3. This volume specifically varies according to the size and number of the loads, the length and width of the tubing and so on, which means that the control is very slow or dull for a predetermined pressure change when the volume contained is small, whereas the control will undergo heavy oscillations when the volume contained is large. In other words, the control damping depends on the system fluid volume enclosed. In order to obtain an optimum damping for different fluid volumes, one is required to adjust the damping of the control loop to the respective system. For the prior art amplifier (Mannesmann Rexroth VT 5041 in Rd. 67016/06.93) this is obtained by selecting a suitable dampening by manually setting a preselected plug.

An object of the present invention is to provide a method allowing to adaptively control the pressure, to keep constant the damping factor for different hydraulic systems, i.e. systems of varying fluid volumes enclosed, thus eliminating a manual ajustment.

According to the invention, a method is provided for pressure controlling a hydrostatic machine applying pressurized fluid to a hydraulic system, said machine having an adjustable delivery volume including an adjusting means for setting the pivot angle of said machine to determine a certain delivery volume, a continuously operable valve and a control circuitry for generating a control signal by subtracting an actual pressure value from a desired pressure value, which control signal is supplied to the continuously operable valve for actuating said adjusting means, characterized by multiplying the differentiated actual pressure value with the actual pivot angle value, and subtracting the product defining a correcting quantity from the desired pressure value to keep the damping factor of the control loop constant independent of different volumes of the hydraulic system to which said machine supplies fluid.

According to the invention, the actual value of the pivot angle of the adjustable pump is combined with the differentiated actual pressure value, i.e. the actual value of the pressure change, and the correcting quantity thus produced is compared with the desired pressure value and the resulting quantity defining the error signal or deviation quantity is applied to the pressure controller. In this way it is possible to automatically adjust an optimum damping factor required for the pressure controller of the system for any pressure control of a cylinder or of another load such as a hydraulic machine disregarding its size and disregarding the fluid volume enclosed in the system. According to the invention, an optimum damping ratio is maintained constant independent of the fluid volume enclosed in the system.

Further aspects of the present invention are referred to in the subclaims. It is particularly useful in improving the controlling operation, when the damping of the pressure control is obtained by multiplying the actual value of the pressure change with the actual pivot angle value, computing the absolute value of this product, extracting the root thereof, whereupon the result is multiplied with the respective sign of the pressure change, and finally subtracting the correcting quantity from the desired pressure value. The pressure control in particularly comprises a proportional controller.

However, when the hydraulic system is controlled in response to the volume, the volume controller 9 is activated and the adjustable pump 1 for actuating a load 3 delivers a fluid volume larger than zero. The volume change may, however, result in switching to the pressure controller which then would erroneously identify this condition as a very large fluid volume enclosed in the system which is not true. To avoid this condition which would result a pressure control when a load is to be actuated, the invention calls for filtering the actual pivot angle value in a high-pass filter to eliminate any steady or low frequency components in the actual pivot angle value. Accordingly, signals of higher frequency only are applied to the pressure controller, which are typically occurring in a pressure control, whereas the steady or low frequency components occurring in a volume control are not applied to the pressure controller, which means that in this condition the minimum value transmitter returns to activate the volume controller, thus the pressure controller does not become effective.

Still further, the method according to the invention is applied to a so-called secondary control system. For this system it is typical that an impressed pressure, i.e. a pressure to be kept constant shall be controlled in a hydraulic system, to which a hydrostatic machine is connected to drive a load, a vehicle or a drum, for example. The hydrostatic machine is of the variable volume type, which is adjusted by an adjusting means controlled through a proportional valve. In response to the size of the load, a certain speed results corresponding to the pivot angle of the machine driving the load. In this context it is referred to U.S. Pat. Nos. 4,688,380; 4,845,950; 5,070,695 specifying this type of a secondarily controlled system. The method according to the invention is further suitable for the speed control of such a secondary system, i.e. the actual values and desired values for the pressure are replaced by the actual values and desired values of the speed. Accordingly, the damping factor of the speed control is adjusted to an optimum disregarding the inertia moment of the respective load. This refers to an adaptive speed control to automatically optimize the damping factor of the speed control corresponding to the respective inertia moment of the driven load, thus eliminating a manual adjustment of the control with respect to the inertia of the drive means.

Additional advantages and benefits of the present invention will become apparent upon a reading of the description of the preferred embodiments taken in conjunction with the accompanying drawing.

BRIEF DESCRIPTION OF THE DRAWING

FIG. 2 is a diagram of a controller for pressure controling the system of FIG. 1 according to the invention and FIG. 3 is a diagram of a speed control of a secondary system

DETAILED DESCRIPTION

Figure 1:
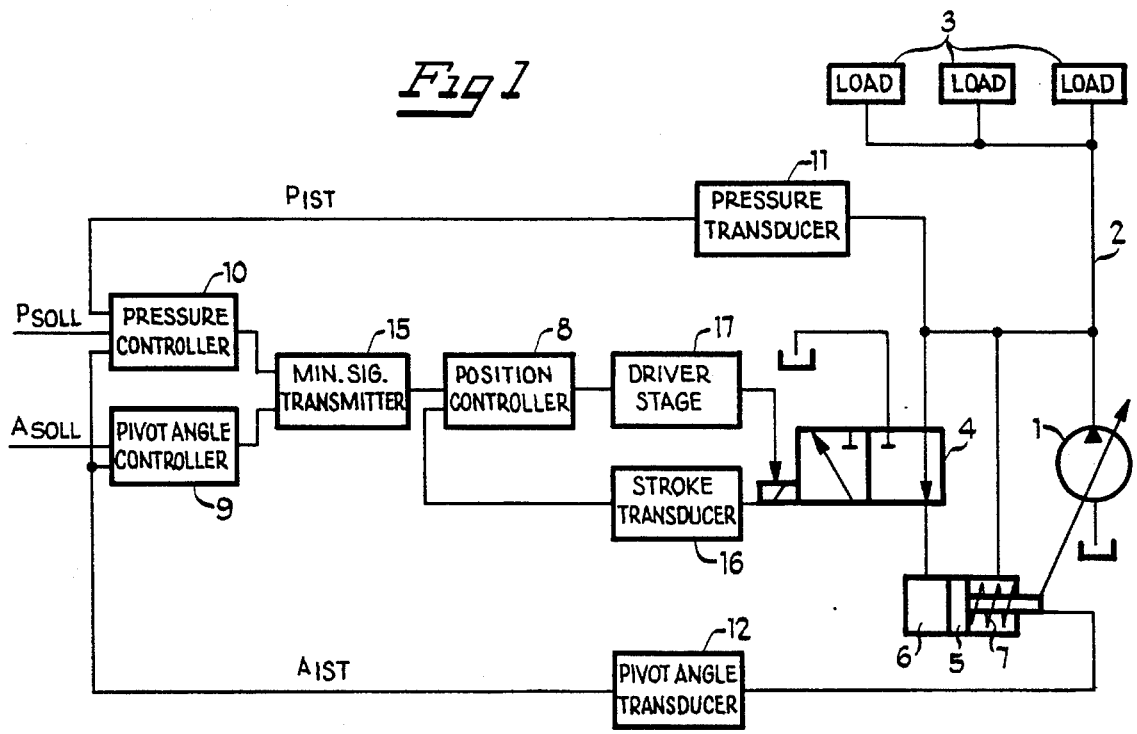
FIG. 1 is a diagram of a controller controlling the pressure and pivot angle of an adjustable pump according to the prior art.
Figure 2:
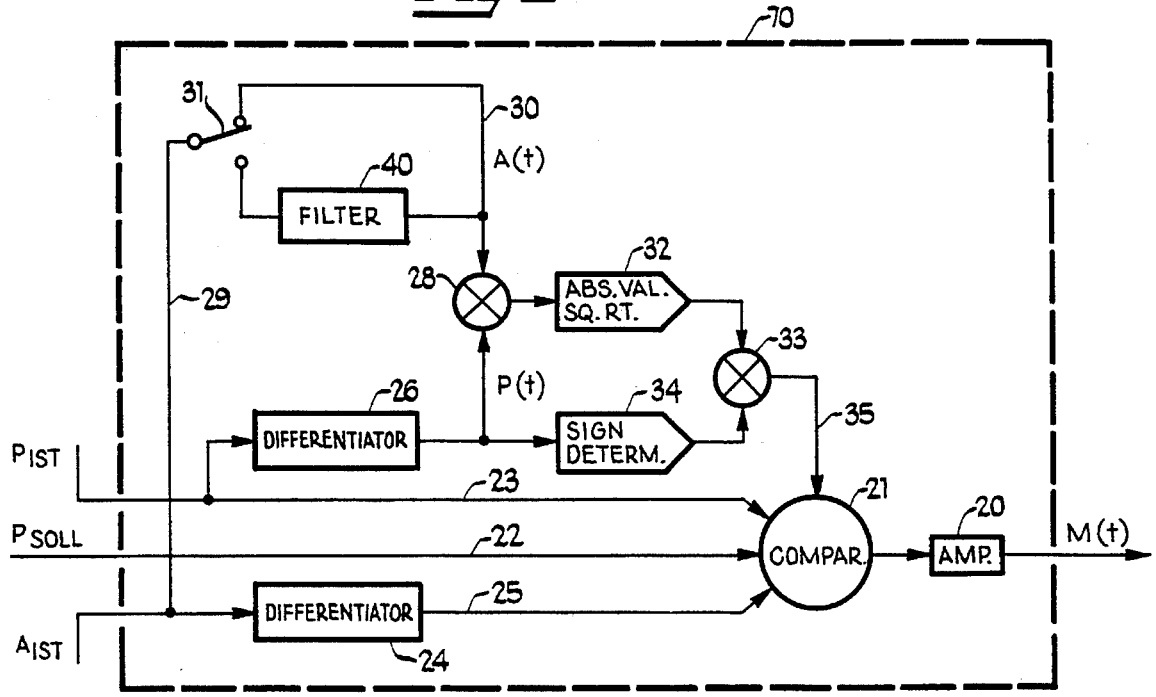

As above indicated, FIG. 1 relates to a pressure and volume control system of an adjustable pump 1 according to the prior art. FIG. 2 illustrates the wiring of the pressure controller 10 shown in FIG. 1 as described to some detail as follows. It should be noted that the adjusting means 5, 6 of pump 1 is controlled by a proportional valve which may be replaced by a servo valve for example. Valves of this type are referred to as continuously operable valves. Still further, the valve position controller 8 shown in FIG. 1 may be eliminated.

According to FIG. 1 the same input signals as referred to above, i.e. the actual pressure value sensed by the pressure transducer 11, the desired pressure value which is freely to be selected and the actual pivot angle value sensed by the stroke transducer 12 of the adjusting means 7 are applied to the pressure controller 10. The output of the pressure controller 10 is connected to the minimum value transmitter 15 shown in FIG. 1. FIG. 2 shows a control amplifier 20 which receives the output signal from a comparing stage 21 to which the desired pressure value is fed via line 22. The comparing stage 21 further receives the actual pressure value via line 23 as well as the actual pivot angle value αist or, respectively, an actual pivot angle value differentiated in a differentiating stage 24 via a line 25. All this is conventional.

According to the invention, there is provided a differentiating stage 26 to differentiate the actual pressure value applied from line 23 to thus obtain the first differentiation, i.e. the change of the actual pressure value, which signal is applied to a multiplying stage 28. The other input of the multiplying stage 28 receives the actual pivot angle value via a line 29 and 30. The multiplying stage 28 produces the product of both input signals and the product is applied to a circuit 32 in which the absolute value of the product is calculated and in which the square root is extracted. In a further multiplying stage 33, the output signal of circuit 32 is multiplied with the output signal of a further circuit 34, which determines the sign of the pressure change, i.e. whether or not the pressure increases or decreases. The correcting quantity thus determined i.e. the output signal of the multiplying stage 33 is applied through a line 35 to the camparison stage 21. All signals on lines 23, 25 and 35 are subtracted from the desired pressure value on the line 22 and the error signal is fed to the proportional controller.

The diagram of FIG. 2 represents the following control calculation:

$$u(t) = K_R \, (Psoll - Pist) - K_A \cdot \sqrt{|\alpha \cdot \dot{p}|} \, \text{sign}(\dot{p})$$

wherein $K_R$ and $K_A$ are controller constants.

In the above equation the differentiated actual pivot angle value is not considered which functions to stabilize the control operation and may be eliminated. It is further noted that the combination of the differentiated actual pressure value $\dot{p}$ and the actual pivot angle value by means of the multiplying stage 28 is substantial, while the signal processing in the circuit 32, 33 and 34 optimizes the result.

The circuit of the control system shown in FIG. 2 makes the damping factor independent of the fluid volume of the respective system including the pressure line 2 and the load 3. According to FIG. 1, the signal from the pressure controller 10 is fed to the minimum value transmitter 15 selecting either the positioning quantity of the pressure controller 10 or of the volume controller 9 as described above. In case the delivery of the pump 1 is larger than zero, because a load 3 is activated, the pressure controller 10 when being selected identifies this condition to be a very large fluid volume which is indeed an error as being not true. To avoid this condition, that the control system does not again return to controlling the volume under these conditions, the actual pivot angle value is passed through a high-pass filter 40 shown in FIG. 2 as is symbolically indicated by the switch 31. The steady and low frequency components are eliminated in the high pass filter 40 from the actual pivot angle value and the higher frequency components only indicating a pressure control will be applied to the multiplying stage 28.

FIG. 3 shows a secondary controlled system, in which an impressed pressure is generated in a pressure line 45 including an accumulator 46 by a pump not shown. For example, a hydrostatic machine 47 of adjustable volume is connected to the pressure line 45 which machine drives a load (not shown) through a shaft 48. For adjusting the volume of the machine 47, an adjusting means 49 is provided which is actuated by a proportional valve 50 as described before for the device shown in FIG. 1. The pressure controller 10 shown in FIG. 1 comprises a proportional speed controller 100 in FIG. 3 to control the speed of the machine 47. The inputs of the speed controller 100 are shown to be the desired speed value, the actual speed value sensed by a tachogenerator 51 coupled to the shaft 48 and the actual pivot angle value sensed by the pivot angle transducer 52 of the adjusting means 49. The wiring of the speed controller 100 fully corresponds to that of the pressure controller 10 which has been shown in FIG. 2, but there is the distinction that the actual and desired values for the pressure are replaced by the actual and desired values for the speed.

Accordingly, there is disclosed an adaptive speed control of the machine 47 which is independent of the inertia of the load driven by the shaft 48. FIG. 3 is a simplified diagram, just illustrating the speed controller, whereas the pressure controller for the pressure system 45 and an additional volume controller for the machine 47 as well as a superimposed valve position controller are eliminated. In FIG. 3, the positional quantity delivered by the speed controller 100 is directly applied to the valve amplifier 53.

We claim:

1. A method for pressure controlling a hydrostatic machine applying pressurized fluid to a hydraulic system, said machine having an adjustable delivery volume defined by a pivot angle of said machine and including an adjusting means for setting the pivot angle of said machine to determine a certain delivery volume, a continuously operable valve and a control loop having a damping factor for generating a pressure control signal by subtracting an actual pressure value from a desired pressure value, said control signal being supplied to the continuously operable valve for actuating said adjusting means, the method comprising the steps of: differentiating the actual pressure value to produce a pressure change value, multiplying the pressure change value by the pivot angle value to produce a product defining a correcting quantity, and subtracting the product from the desired pressure value to keep the damping factor of the control loop constant and independent of different volumes of the hydraulic system to which said machine supplies fluid.

2. The method of claim 1, further comprising the steps of generating the absolute value of the product, extracting the square root from the absolute value, determining the sign of the pressure change value, multiplying the square root by the sign of the pressure change value to produce a correcting quantity and subtracting the correcting quantity from the desired pressure value.

3. The method of claim 1, further comprising the step of differentiating the actual pivot angle value to produce a pivot angle change value, wherein an error signal for the control circuitry is generated by subtracting the actual pressure value, the pivot angle change value and the correcting quantity from said desired pressure value.

4. The method of claim 1, wherein the control loop includes a proportional controller.

5. The method of claim 1, wherein said control signal is a pressure control signal and the control loop includes volume control means for generating a volume control signal, and further comprising the steps of selecting the smaller of the pressure control signal and the volume control signal, applying the selected signal to the continuously operable valve for actuating said adjusting means and filtering said pivot angle value to eliminate steady and low frequency signals corresponding to changes of volume and to transmit a filtered pivot angle value including higher frequency signals of the pivot angle value corresponding to changes of pressure, the multiplying step including multiplying the pressure change value by said filtered pivot angle value.

6. The method of claim 1, wherein the control loop includes a valve housing and a valve position control means, and further comprising the step of applying the control signal to the valve position control means.

7. A method for speed control of a hydrostatic machine having a variable delivery volume defined by a pivot angle of said machine, which machine is connected to a pressure system having an impressed pressure to drive a load including an adjusting means which is controlled by a continuously operable valve to which an output signal is supplied from a controller, in which the output signal is generated by subtracting an actual speed value from a desired speed value, the method comprising the steps of: differentiating the actual speed value to produce a speed change value, multiplying the speed change value by the pivot angle value to produce a product defining a correcting quantity, and subtracting the product from the desired speed value.

\* \* \* \* \*